United States Patent
Boehm et al.

[15] 3,656,939
[45] Apr. 18, 1972

[54] RECOVERY OF PALLADIUM FROM RINSE WATER

[72] Inventors: Dennis R. Boehm, Grand Rapids; Kenneth R. Hampel, Grandville, both of Mich.

[73] Assignee: Gulf & Western Industrial Products Company, Grand Rapids, Mich.

[22] Filed: July 20, 1970

[21] Appl. No.: 56,707

[52] U.S. Cl. ........................75/108, 75/101 BE, 75/121
[51] Int. Cl. ..........................................C22b 11/04
[58] Field of Search..............75/121, 101 BE, 108; 23/87, 23/204, 50 BE; 210/37, 38

[56] References Cited

UNITED STATES PATENTS 2,726,141  12/1955  Appell.....................75/101 BE UX
2,773,742  12/1956  Connor....................75/101 BE UX
3,473,921  10/1969  Schmuckler..................75/121 X Primary Examiner—Hyland Bizot
Assistant Examiner—G. T. Ozaki
Attorney—Meyer, Tilberry and Body

[57] ABSTRACT

A process for the essentially total removal of palladium cations in a cation exchange resin bed, followed by removal of chloride and palladium chloride anions in an anion exchange bed. Recovery of the precious metal is effected by mixing the solutions used to regenerate the ion-exchange beds in such proportion as to maintain a pH of less than 6 for the mixture, then adding a reducing agent to the precipitate palladium to the substantial exclusion of all other metals.

6 Claims, No Drawings 3,656,939

RECOVERY OF PALLADIUM FROM RINSE WATER

BACKGROUND OF THE INSTANT INVENTION

This invention relates to a process for the removal of palladium from aqueous solutions, employing sequential sorption in a cation exchange resin and an anion exchange resin, each of which is particularly selected for palladium cations, and palladium chloride anions in conjunction with chloride ions, respectively.

Palladium containing solutions are used to activate metallic or non-metallic parts prior to electroplating. This is usually done in an activator bath which is an aqueous acidic solution containing dissolved palladium salts, such as palladium chloride, palladium sulfate or palladium nitrate. The parts are removed from the activator bath, then rinsed with water before being electroplated. The rinse water removes the excess activator solution which still adheres to the parts, and therefore contains a very small but economically significant quantity of palladium. The problem is to recover this precious metal. Other metals may also be present in the rinse water solution, such as chromium, copper and nickel. In the past, minor quantities of palladium were recovered by reaction with an alkali metal hypophoshite dip solution and precipitating the palladium as spongy palladium phosphides. Unfortunately, because of the high catalytic activity of palladium, a continuous breakdown of the phosphite occurs, thus a much greater amount than the theoretical amount of alkaline metal hypophosphite is required; in fact, the destruction of "Hypophosphite" is on such a scale as to make the cost of this recovery method of the palladium unattractive. It therefore became necessary that some totally different approach to the problem be implemented.

The use of ion-exchange systems has offered convenient and economical solutions to many purification and disposal problems; in some cases ion-exchange resins have been used to recover heavy metals. In general, precious metals have been recovered from cyanide-containing solutions but this operation has not been notably successful, partly because certain mixtures of heavy metal cations as used in plating baths are chelated and partly because the cyanide exhibits a tendency to foul the resin. Additionally, some resins are not stable to oxidation, and still others, particularly weakly basic anion exchange materials, tend to display discouragingly low loading capacities and poor regeneration efficiency. In light of past failures with weak-base ion-exchange resins, it is particularly surprising that the instant process is eminently workable with a strong-acid and a strong-base ion-exchange system in which the resins are used serially, the first for removing palladium cations and the second for removing chloride and palladous chloride anions.

It is well known that the recovery of even very small amounts of precious metals present in industrial solutions which have to be discarded can be justified. For instance, as little as 1 p.p.m. of palladium present in waste rinse water from a plating bath can rapidly add up to the loss of a large sum of money. Additionally, the small quantities of palladium salts present in aqueous solutions may pose a problem when discharged into natural waters or into sewage systems, because of local regulations governing the nature of dischargeable effluents. The instant invention provides a simple and highly effective solution to a difficult problem.

SUMMARY OF THE INSTANT INVENTION

It has been discovered that very small quantities of palladium in the range from about 1 to about 10 parts per million in aqueous solutions may be recovered by serially ion exchanging the rinse water in two separate ion-exchange beds, the first one being a cation exchange bed containing a strong-acid ion-exchange resin, and a second bed being an anion exchange resin bed containing a strong-base anion exchange resin. The recovery of palladium cations in the cation exchange bed and of palladous chloride ions in the anion exchange bed is essentially total. Though other metal contaminant ions are also ion exchanged in both the cation exchange and anion exchange resin beds, the level of contaminants does not impair the function of the resin beds until the beds are totally exhausted.

The ion-exchange resin beds are regenerated conventionally; that is, the cation exchange bed is flushed with a strong acid, and the anion exchange bed is flushed with a strong base. The acid and alkaline solutions containing precious metal ions from both the cation and the ion-exchange resin beds are thereafter mixed so as to maintain the mixture slightly acid, to prevent the precipitation of hydroxides of metals in solution. Thereafter a reducing agent such as an alkali metal hypophosphite, boranes and the like may be added to precipitate the palladium as palladium metal, including palladium phosphides, to the nearly total exclusion of all other metals.

PREFERRED EMBODIMENT OF THE INVENTION the process for removing palladium from its solution is extremely simple and convenient. It is required only that the palladium containing solution be contacted first with the cation exchange resin and then with the anion exchange resin. This may be done batchwise, simply mixing the polymeric ion-exchange materials with the solution to be treated, and allowing it to settle. Alternatively, if column operations are employed, the palladium containing solution is passed over the bed or column of the ion-exchange materials. The rate of flow of the solution may be adjusted to effect complete removal of palladium in one pass or the solution may be passed over the column at a more rapid rate and recycled until palladium removal is complete.

The strong-acid cation exchange resin which traps palladium cations most effectively is one which is macroporous, having pore diameters from about 10–100 angstroms or more. Most preferred is a strong-acid resin such as IWT C–211 cation resin (made by Illinois Water Treatment Company) which is a styrene divinyl benzene bead in which the cation exchange group is added, after polymerization of the bead, by sulfonation.

The strong-base anion exchange resin which most effectively traps chloride and palladous chloride anions is one which is macroporous, having pore diameters from about 30–150 angstroms or more. Chemically, these materials contain an intermediate amine as the exchange site. Particularly good results are obtained when the resin used is a mixture of secondary and tertiary amines, since these resins are considerably more stable to oxidation than are resins which have reaction sites consisting solely of primary and secondary amines. Particularly useful resins for this purpose are the polystyrene divinyl benzene amines which contain quaternary ammonium groups, such as IWT A–284.

Palladium is also used in activating baths in the form of a colloidal and tin palladium solution in strong acid medium. Rinse water after such an activator is also treated in the manner as specified herein fro the recovery of palladium.

In a preferred embodiment of the instant invention, a cation exchange resin bed and an anion exchange resin bed are in fluid communication with each other so that rinse water containing palladium salts in solution pumped into the top of the cation exchange bed flows downwardly therethrough, and is withdrawn from the bottom of the bed. Thereafter, it is flowed into the top of the anion exchange bed and is withdrawn from the bottom thereof. The effluent from the anion exchange bed may be returned to the rinsing operation or it might be recirculated if desired. Downward flow through the ion-exchange beds is desirable since the densities of the ion-exchange resins are such that introduction of an aqueous stream into the bottom of the beds would float out too much of the resins and cause channeling.

It is an essential and critical part of the instant invention that the rinse water solution containing dissolved palladium salts (referred to as "rich" water) be first flowed through the cation exchange resin bed and then through the anion exchange resin bed. The loading on the resin beds may be checked by any conventional analytical means. If the activator bath concentration is maintained between a relatively narrow range, it will be found that the composition of the rich rinse water stays relatively constant and that the period of on-stream time for the beds is quite predictable. To check loading, it is preferred that a small sample be taken from the effluent from each bed after some period of time, and checked by some sensitive method for analysis, such as spectrographic or atomic absorption methods to determine whether any palladium is present in the effluent. If more than 15 p.p.m. palladium is present, the beds should be regenerated. If the activated bath concentration and production processing conditions are maintained between a relatively narrow range, it will be found that the period of on-stream time for the beds is quite predictable.

It will be noted that in the particular embodiment disclosed herein, wherein the lean rinse water (depleted of its palladium content) is recycled to the rinsing station, it is immaterial that some of the palladium remains in the solution. However, with the combination of cation and anion exchange resin beds specified herein, it is unlikely that more than a trace of palladium remains after passage through the beds. If a significant quantity of palladium is found in the effluent from the anion exchange bed, it is time for regeneration of the beds as it is an indication that the resin is loaded.

Regeneration of the beds is accomplished by interrupting the flow of rinse water to the beds, flowing a strong acid through the loaded cations exchange bed and a strong base through the loaded anion bed. Convenient regeneration solutions are hydrochloric acid and caustic soda. The regeneration solutions may be flowed downwardly through the bed in the same manner as the rinse water, or it may be flowed upwardly through the bed, if the flow rates are extremely slow. In general it is found more convenient to flow the regeneration solutions downwardly through the beds and to flow them upwardly for a short period of time, at a slot rate, to overcome any channeling that may have occurred in the beds.

In the following example there is set forth a detailed run with the use of particular resins and a palladium rinse water solution which may contain from about 1 to about 10 p.p.m. of palladium metal.

EXAMPLE

Typical Composition of Rinse Water Solution

| | |
|---|---|
| pH of solution | 2.2-3.0 |
| Chromium | 5-10 p.p.m. |
| Nickel | 5-10 p.p.m. |
| Palladium | 5-10 p.p.m. |
| Copper | 0-5 p.p.m. |
| Iron | 5-10 p.p.m. |
| Volume of cation exchange bed and cation exchange resin | 2 ft³ |
| Volume of anion exchange bed and anion exchange resin | 2 ft³ |
| Flow rate of rinse water solution | 300-400 gpm |

Regeneration commenced after 80 hours on-stream time.

| | |
|---|---|
| HCl regeneration solution flow rate | 300 gal./hr |
| Caustic soda regeneration solution flow rate | 300 gal./hr |
| Time for regeneration of cation exchange resin bed | 45 min. |
| Time for regeneration of anion exchange resin bed | 45 min. |

The acid regeneration solution containing palladium metal is stored in an acid tank. The same solution containing the palladium may be reused for regeneration until the build-up of palladium reaches about 50 parts per million parts of aqueous acid. Similarly, the caustic solution is stored in a caustic tank and may be reused until the build-up of palladium in the caustic solution reaches about 50 parts per million parts of caustic solution. It is most preferred to use fresh regeneration solutions in each of the ion-exchange resin beds recirculating the solution for about 45 to 60 minutes per bed, then storing the solutions for mixing at a convenient time. If the solutions obtained upon regeneration of the beds are reused, the efficiency of the recovery of palladium ions decreases as the palladium concentration increases despite the fact that the regeneration efficiency is not noticeably affected.

Solutions obtained upon regeneration are mixed in such proportion as to maintain a mixture that is always acid, to preclude the precipitation of several metals simultaneously. As long as the mixture is maintained acid all the metals remain in solution. To the acidic mixture is then added slightly more than the theoretically required amount of an alkali metal hypophosphite, preferably sodium hypophosphite to precipitate all the palladium, and the mixture stirred. The palladium metal is precipitated both as metal and as phosphides to the substantial exclusion of all other metals. Analysis indicates that only traces of nickel phosphides are co-precipitated with palladium. The precipitated palladium is recovered by filtration, decantation or by centrifuging the solutions and the metal recovered therefrom by known methods.

What is claimed is:

1. The method of recovering substantially all palladium present in a rinse water solution containing dissolved palladium salts in the concentration range from about 1 to 200 parts per million palladium, in addition to small amounts of other metal salts dissolved therein, additively present in the range from about 1 to 300 parts per million, including palladium, which comprises sequentially flowing said rinse water through a strong acid cation exchange resin and thereafter contacting the eluent from said cation exchange resin with a strong-base anion exchange resin to substantially completely remove all palladium ions.

2. The process of claim 1 wherein said cation exchange resin consists essentially of a styrene divinyl benzene polymer in which the cation exchange group is added after polymerization and said strong-base anion exchange resin is a styrene divinyl benzene polymer containing quaternary ammonium groups.

3. The process of claim 1 wherein said cation exchange resin is regenerated with a strong-acid aqueous solution and said anion exchange resin is regenerated with a strong-base aqueous solution, said strong-acid and said strong-base aqueous eluent solutions from each bed being subsequently mixed so as to maintain the mixture in an acid state to permit metals such as Cr, Cu, Ni and Fe to remain in solution, thereafter adding a reducing agent in excess of the amount theoretically required to precipitate palladium metal and palladium compounds in solution, thereafter recovering said precipitated palladium and palladium compounds.

4. The process of claim 3 wherein said eluent obtained upon regeneration of said strong-acid cation exchange resin and said eluent obtained from said strong-base anion exchange resin are separately stored and recirculated until the palladium ion concentration in either of said eluents is about 50 parts per million parts of eluent solution.

5. A process of claim 3 wherein said reducing agent is an alkali metal hypophosphite.

6. A process of claim 5 wherein said reducing agent is sodium hypophosphite.

* * * * *